(12) United States Patent
Kilb

(10) Patent No.: US 9,178,375 B2
(45) Date of Patent: Nov. 3, 2015

(54) METHOD FOR CHARGING A RECHARGEABLE ENERGY STORE, CHARGING DEVICE FOR A RECHARGEABLE ENERGY STORE, AND CIRCUIT BREAKER

(75) Inventor: Jochen Kilb, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 485 days.

(21) Appl. No.: 13/577,683

(22) PCT Filed: Dec. 20, 2010

(86) PCT No.: PCT/EP2010/070188
§ 371 (c)(1),
(2), (4) Date: Feb. 5, 2013

(87) PCT Pub. No.: WO2011/098183
PCT Pub. Date: Aug. 18, 2011

(65) Prior Publication Data
US 2013/0141042 A1    Jun. 6, 2013

(30) Foreign Application Priority Data

Feb. 9, 2010    (DE) .......................... 10 2010 001 712

(51) Int. Cl.
*H02J 7/00*        (2006.01)
*B60L 3/00*        (2006.01)
(Continued)

(52) U.S. Cl.
CPC .............. *H02J 7/007* (2013.01); *B60L 3/0069* (2013.01); *B60L 3/04* (2013.01); *B60L 11/1809* (2013.01);
(Continued)

(58) Field of Classification Search
CPC ........ H02J 7/007; H02J 7/0026; H02H 3/085; B60L 11/1809; B60L 11/1816; B60L 3/0069; B60L 2240/36; Y02T 90/14; Y02T 10/7055; Y02T 90/121; Y02T 10/7088; Y02T 10/7005
USPC ......................................................... 320/109
See application file for complete search history.

(56) References Cited

U.S. PATENT DOCUMENTS

2005/0103613 A1    5/2005 Miller
2009/0195237 A1    8/2009 Feliss et al.
(Continued)

FOREIGN PATENT DOCUMENTS

| DE | 10 2007 038 376 | 2/2009 |
| GB | 2 450 426 | 12/2008 |
| WO | WO 2009/020606 | 2/2009 |
| WO | WO 2011098183 A2 * | 8/2011 |

OTHER PUBLICATIONS

International Search Report for PCT/EP2010/070188, dated Sep. 6, 2011.

*Primary Examiner* — Jack Chiang
*Assistant Examiner* — Brandon Bowers
(74) *Attorney, Agent, or Firm* — Kenyon & Kenyon LLP

(57) ABSTRACT

A method for charging a rechargeable energy store, including: coupling the rechargeable energy store to a power supply line; ascertaining a piece of utilization information regarding a capacity utilization of a tripping load of a circuit breaker coupled to the power supply line; and/or ascertaining a separate piece of charging information regarding a power and/or a time remaining of a separate charging current supplied to another energy store by the power supply line; setting at least one selection variable regarding a time characteristic of a setpoint current intensity of a setpoint charging current supplied by the power supply line to the energy store, in view of the ascertained utilization information and/or the ascertained, separate charging information; and applying a charging current from the power supply line to the energy store in view of the at least one set selection variable. A related charging device and a circuit breaker are described.

10 Claims, 2 Drawing Sheets

(51) Int. Cl.
*B60L 3/04* (2006.01)
*B60L 11/18* (2006.01)
*H02H 3/08* (2006.01)

(52) U.S. Cl.
CPC ............ *B60L 11/1816* (2013.01); *H02H 3/085* (2013.01); *H02J 7/0026* (2013.01); *B60L 2240/36* (2013.01); *Y02T 10/7005* (2013.01); *Y02T 10/7055* (2013.01); *Y02T 90/14* (2013.01)

(56) References Cited

U.S. PATENT DOCUMENTS

| | | | |
|---|---|---|---|
| 2010/0156355 A1* | 6/2010 | Bauerle et al. | 320/145 |
| 2011/0133693 A1 | 6/2011 | Lowenthal et al. | |
| 2011/0221393 A1* | 9/2011 | Billmaier | 320/109 |

\* cited by examiner

METHOD FOR CHARGING A RECHARGEABLE ENERGY STORE, CHARGING DEVICE FOR A RECHARGEABLE ENERGY STORE, AND CIRCUIT BREAKER

FIELD OF THE INVENTION

The present invention relates to a method for charging a rechargeable energy store. In addition, the present invention relates to a charging device for a rechargeable energy store. Furthermore, the present invention relates to a circuit breaker.

BACKGROUND INFORMATION

German patent document DE 10 2007 038 376 A1 discusses a charging device for charging a battery. With the aid of the charging device, a charging current may be made available by a power supply line, to which the battery may be coupled. In addition, the described charging device is intended to have the function of determining the battery storage capacity. By determining the battery storage capacity, it should be able to be detected if sufficient operability of the battery is ensured.

SUMMARY OF THE INVENTION

The exemplary embodiments and/or exemplary methods of the present invention provide a method for charging a rechargeable energy store, having the features described herein, a charging device for a rechargeable energy store, having the features described herein, and a circuit breaker having the features described herein.

Normally, when an energy store is charged by a charging current drawn from a power supply line, a circuit breaker (overload device) of the power supply line is often tripped, or, if it is not equipped with the circuit breaker, the power supply line is often overloaded. Such a situation may occur, in particular, when an energy store suitable for an energy-hungry load and/or several energy stores are simultaneously charged. However, with the aid of the exemplary embodiments and/or exemplary methods of the present invention, it is possible to carry out the charging of an energy store in such a manner, that a predefined load threshold of the circuit breaker coupled to the power supply line is not exceeded and/or the charging operation is adjusted to the charging of the further energy store. This reduces the probability of tripping the circuit breaker (overload device) and/or overloading the power supply line connected to the at least one energy store. Consequently, it may be ensured that the desired charging operation is not interrupted by the tripping of the circuit breaker and/or overheating of the power supply line. In particular, with the aid of the exemplary embodiments and/or exemplary methods of the present invention, the desired charging operation may be carried out in such a manner, that a maximum electric current optimized with regard to the load threshold of the circuit breaker and/or with regard to the additional charging of the further energy store may be reliably supplied to the energy store to be recharged.

In particular, the exemplary embodiments and/or exemplary methods of the present invention described in the following reliably integrates rechargeable energy stores for energy-hungry load circuits into an infrastructure already present. For example, a power supply system of a residential building may be understood as an infrastructure already present. At the same time, a maximum permissible power output is achievable when reliable integration is ensured.

For example, the exemplary embodiments and/or exemplary methods of the present invention renders possible an advantageous battery charger for a hybrid and an electric vehicle, which is configured to adapt the power requirement of a charging circuit of a vehicle-specific energy store to an existing infrastructure, for example, to a power supply line having a circuit breaker and several connected current consumers. As described below in more detail, the charging device ensures reliable charging of the vehicle-specific energy store, which is not interrupted by the tripping of a circuit breaker and/or an overload of the power supply line. This is associated with the advantage that after activating a charging operation, for example, by inserting a plug into a jack belonging to a network of a residential building, a user of the electric vehicle can safely expect that the desired charging operation is reliably carried out.

As explained below in more detail, only a comparatively low degree of measuring expenditure is necessary for implementing the exemplary embodiments and/or exemplary methods of the present invention described in the following. In particular, the measuring expenditure may be limited to a power or current measurement, or a temperature measurement that replaces this and is taken in the protection circuit. Such measurements may carried out by inexpensive sensors. A complicated evaluation of the ascertained values is also not necessary. Therefore, an inexpensive evaluation device may be used for evaluating the ascertained values.

It should be pointed out that in order to ensure reliable charging, conventional charging devices, such as the charging device described in DE 10 2007 038 376 A1, are only configured to take into account an operativeness of the battery to be charged. In contrast, the exemplary embodiments and/or exemplary methods of the present invention are based on the knowledge that a reliability of recharging a rechargeable energy store may be increased by adjusting the charging operation to a current capacity utilization of the circuit breaker of the power supply line used, and/or to an additional charging of at least one further energy store on the power supply line used. In addition to that, in the case of the method described here, and in the corresponding charging device, an operativeness of the rechargeable energy store may also be ascertained and taken into account, for example, by determining the battery storage capacity during the recharging. Thus, the exemplary embodiments and/or exemplary methods of the present invention expands the advantages of a conventional charging device.

Additional features and advantages of the present invention are explained below, with reference to the figures.

DETAILED DESCRIPTION

Figure 1:
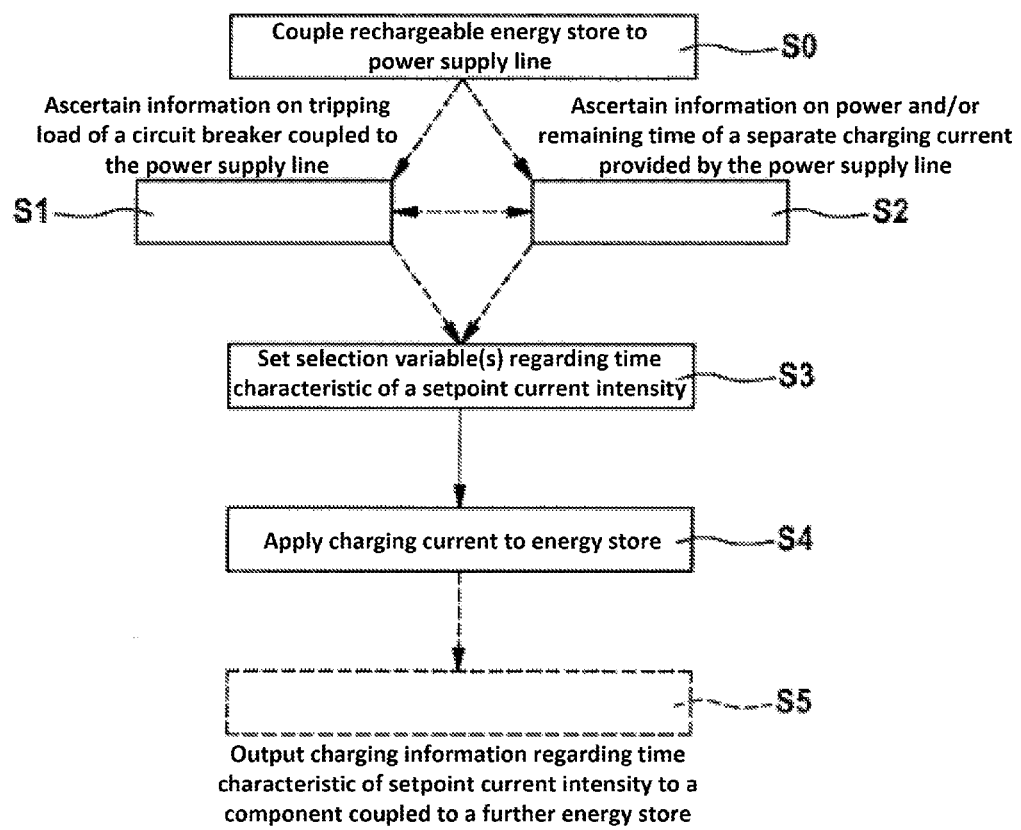
FIG. 1 shows a flow chart for illustrating a specific embodiment of the method for charging a rechargeable energy store.

FIG. 1 shows a flow chart for illustrating a specific embodiment of the method for charging a rechargeable energy store.

In a preceding method step S0, the rechargeable energy store, for example, a battery, in particular, a vehicle battery, is coupled to a power supply line. As explained below in more detail, the method described here is configured in such a manner, that no particular requirements are to be set for the utilized power supply line for charging the rechargeable energy store. For example, in order to charge the energy store, it is no longer necessary to use a power supply line, in which a comparatively high, minimum current intensity over a certain, minimum time is ensured without an overload of the power supply line. The power supply line may be, in particular, a power supply line, which is installed in a residential building, and to which a plurality of load circuits, such as the usual household devices, are connected. In general, the coupling of the rechargeable energy store may be accomplished by inserting a corresponding plug into a household jack. In this case, in spite of the comparatively high power demand over a comparatively long period of time, charging of a vehicle battery may also be carried out in a reliable manner.

In a method step S1, a piece of utilization information regarding a capacity utilization of a tripping load of a circuit breaker coupled to the power supply line is ascertained. The tripping load may be understood, for example, as an overload threshold. If an amperage carried by the circuit breaker during a particular time interval exceeds the tripping load (overload threshold), then, as a rule, a switching-off mechanism (tripping mechanism) of the circuit breaker is activated, which causes the circuit breaker to interrupt the flow of current. This is referred to as the tripping of the circuit breaker. The overly high capacity utilization of the circuit breaker, that is, the overly high current intensity for a particular time interval, is established/detected, as a rule, in view of the tripping load according to which the circuit breaker is configured.

The circuit breaker, for which the utilization information is ascertained, may also be understood as a breaker, automatic circuit breaker, an overload protection device and/or an MCB (miniature circuit breaker) device. In addition to the examples listed here, the circuit breaker may also be understood as a different protective element that does not (but may) reset by itself after tripping, but is reusable after being tripped. An example of a suitable embodiment of a usable circuit breaker is discussed below in more detail.

A circuit breaker is a cost-effective and easily installable protective device for protecting/saving an electric line from damage due to overly intense warming resulting from too high a current being carried by the power supply line. To that end, the circuit breaker may have a switching-off mechanism (tripping mechanism), with the aid of which a flow of current through the circuit breaker, and therefore, through the power supply line, is prevented in response to the establishment/detection of an overly high amperage carried by the power supply line for a certain time interval.

For example, a percent capacity utilization of the tripping load, a variable regarding the current capacity utilization of the tripping load and/or a variable regarding a difference of the current capacity utilization and a maximum possible capacity utilization may be ascertained as a piece of utilization information regarding the capacity utilization of the tripping load of the circuit breaker. For example, the utilization information may include at least one current intensity, which may be conducted further through the circuit breaker for a certain time interval in addition to the current load, without having to reckon with the tripping of the circuit breaker. The utilization information may equally include information regarding the current capacity utilization and information regarding the type of circuit breaker, so that when the utilization information is evaluated later, the maximum possible capacity utilization and/or the corresponding tripping load is able to be established in light of the type of circuit breaker, and/or an additional amperage that may be carried by the circuit breaker for a certain time interval without tripping it is ascertainable and/or may be read out of a memory.

As an alternative to, or in addition to, method step S1, the method may also include a method step S2, in which a piece of separate charging information regarding a power and/or a remaining time of a separate charging current provided by the power supply line to a further energy store is ascertained. Thus, the separate charging information may include a piece of information regarding an additional charging operation for charging at least one further energy store, using the same power supply line. One may also refer to this additional charging operation as a separate charging operation. For example, simultaneously to the charging of the rechargeable energy store, a vehicle battery shall also be charged on the same power supply line, using the separate charging current provided. In this case, the separate charging information may include a current intensity of the separate charging current and/or a probable time remaining for a complete charging of the vehicle battery.

In addition, the separate charging information may only include a signal, which indicates that the remaining charging time of the separate charging operation is even greater than a specified minimum time or not equal to zero. The evaluation/utilization of such a piece of separate charging information ("I'm-still-charging" signal) is discussed below.

It should be pointed out that only method step S1 requires a circuit breaker, which is coupled to the power supply line and has an integrated sensor device and signal output device. The execution of method step S2 does not require a(n) (expanded) circuit breaker. Consequently, the method described here is also executable in the case of charging the rechargeable energy store on a power supply line not having a(n) (expanded) circuit breaker. In addition, the numbering used for method steps S1 and S2 does not stipulate any time sequence to adhere to for executing method steps S1 and S2.

In a method step S3, at least one selection variable regarding a time characteristic of a setpoint current intensity of a setpoint charging current to be provided by the power supply line to the rechargeable energy store is set. In this context, the setpoint charging current is set in view of the ascertained utilization information and/or the ascertained, separate charging information. At least one selection variable regarding a constant setpoint current intensity of the setpoint charging current to be set, a greatest current intensity of the setpoint current intensity to be set, a time characteristic of a varying setpoint current intensity of the setpoint charging current to be provided, a waiting time prior to activating the setpoint charging current to be provided, and/or a break-off time of the setpoint charging current to be provided may be set as the at least one selection variable with regard to the time characteristic of the setpoint current intensity.

For example, in method step S3, a constant setpoint current intensity or a time characteristic of a varying setpoint current intensity of the setpoint charging current to be provided is established. In addition, a time interval, for which the setpoint charging current should be activated for recharging the energy store, is set in method step S3. This may also be accomplished by stipulating that the setpoint charging current to be provided only be activated after a waiting time. For example, the time of the separate charging current still remaining may be specially considered when setting the waiting time. In the same way, the recharging of the energy store may be interrupted via the interruption time, in order to prevent an overload of the power supply line due to a charging operation that is too long. As an alternative to, or in addition to, the values mentioned in these paragraphs, corresponding variables may also be set in method step S3.

If an "I'm-still-charging" signal is received as a piece of separate charging information, then, in method step S3, it may be established that the recharging of the reference energy store will be delayed until no more "I'm-still-charging" signal is received within a predefined time span.

In one further refinement, during the reception of the "I'm-still-charging" signal, an "I'm-waiting" signal may be outputted to the at least one component.

In a method step S4, a charging current is applied by the power supply line to the rechargeable energy store. In this context, method step S4 is executed in view of the at least one selection variable set in method step S3.

Using the method described here, a rechargeable energy store may be implemented in a simple manner in further view of an additional capacity of a circuit breaker that is possibly still available, and consequently, in further view of a power supply line used for charging, and/or in further view of a separate charging operation to be carried out with the aid of the power supply line used. This ensures that the recharging of the energy store and/or of the at least one further energy store coupled to the power supply line is not interrupted by the tripping of the circuit breaker and/or an overload of the power supply line. In this context, the recharging of the energy store may be specially adapted to the characteristics of the power supply line and/or of the circuit breaker.

In an optional method step S5, a piece of reference charging information regarding the time characteristic of the setpoint current intensity may be output to a component coupled to the further energy store prior to or while applying the charging current. Therefore, the separate charging of the at least one further energy store may also be adapted to the charging of the rechargeable energy store. After reception of the separate charging information, an "understood" signal may be outputted to the component, as well.

In a further refinement of the method described here, the component and the charging device of the rechargeable energy store may coordinate, among themselves, their charging operations still to be executed. One may also say that the at least one component and the charging device are configured as intelligent load circuits/battery chargers. For example, the component may also reset a setpoint quantity regarding the power and/or the remaining time of the separate charging current after receiving a message from the charging device. In addition, in an optional method step, the piece of reference charging information may also be outputted to a charging unit connecting to the power supply line during the application of the charging current. It should be pointed out that the further refinements listed here are feasible with or without an intelligent circuit breaker.

An exemplary embodiment is briefly described in the following:

In the exemplary embodiment, the battery chargers couple two electric vehicles, which each have a power input of 3000 W, to the same power supply line. The power supply line has a protective circuit with 16 A at 230 V, which yields a power-handling capacity (tripping load/overload threshold) of app. 3600 W. After the coupling, the two battery chargers of the electric vehicles may carry out, e.g., a master-slave function, using the method described here. In particular, by setting the waiting time in view of a time still remaining for charging the battery of the battery charger first connecting to the power supply line, the battery charger subsequently coupling to the power supply line may particularly ensure that the charging of the reference battery is delayed until the separate charging operation is completed, or that the reference power input is limited to a value that is not critical for the power supply system. By such use of the power supply line/resources in a manner coordinated with one another, which may also be referred to as a "first come, first serve" method, it is ensured that the batteries of the two vehicles may be reliably charged without tripping a circuit breaker and/or overloading the utilized power supply line and, therefore, interrupting the desired charging operations.

Figure 2:
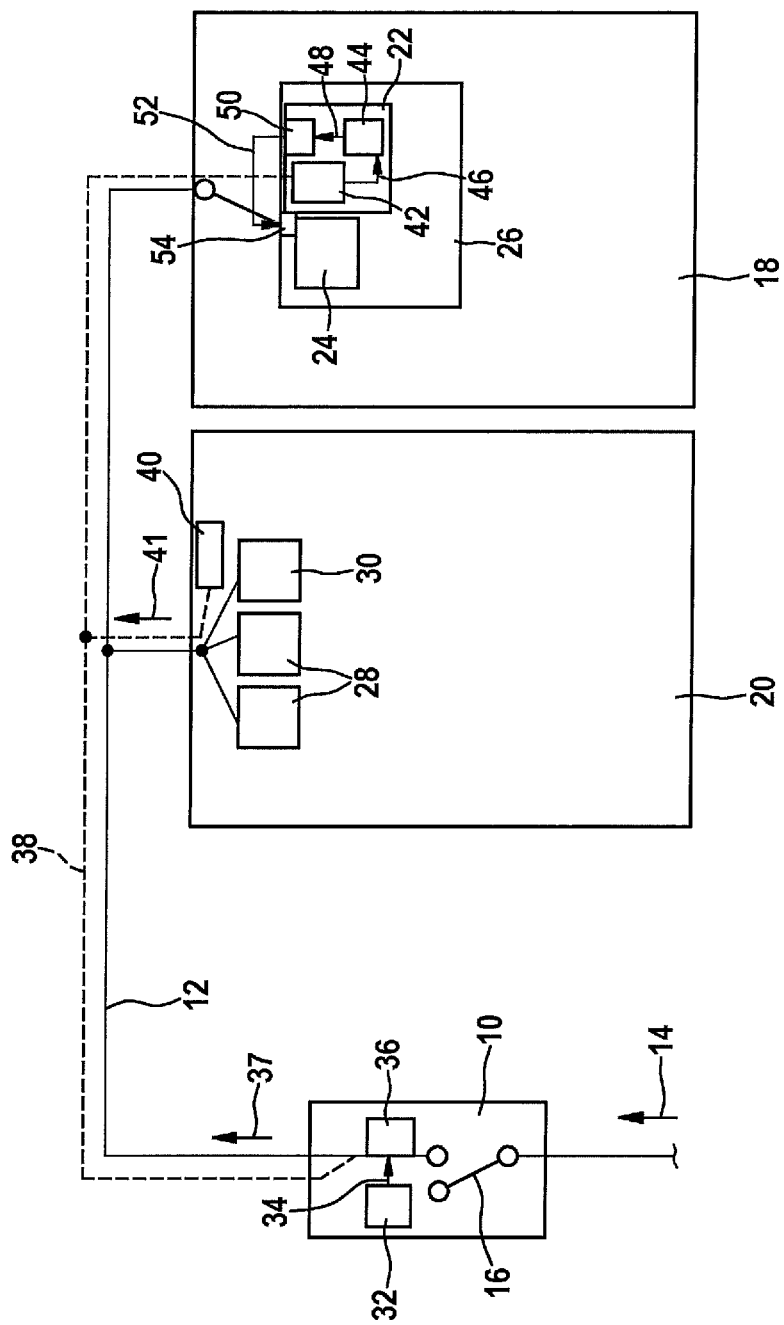
FIG. 2 shows a schematic representation of a specific embodiment of the charging device and a corresponding specific embodiment of the circuit breaker.

FIG. 2 shows a schematic representation of a specific embodiment of the charging device and a corresponding specific embodiment of the circuit breaker.

The circuit breaker 10 schematically represented in FIG. 2 is coupled to a power supply line 12. Coupling circuit breaker 10 to power supply line 12 may be understood to mean that circuit breaker 10 is positioned within power supply line 12 in such a manner, that a flow of current 14 along power supply line 12 is directed through circuit breaker 10. The circuit breaker is configured to have a tripping load (overload threshold) set/fixed for circuit breaker 10. If a current intensity of current flow 14 carried by circuit breaker 10 during a particular time interval exceeds the tripping load (overload threshold), then a switching-off mechanism (tripping mechanism) 16 of circuit breaker 10 is activated, which interrupts the flow of current 14 through circuit breaker 10. In particular, circuit breaker 10 may be configured so that the time from exceeding the nominal current up to tripping circuit breaker 10 is a function of the difference of the nominal current and the current intensity of the overload current. Thus, in the event of a high overload current, the tripping time may be shorter than in the case of exceeding the nominal current to a small degree.

For example, current or power measurement may be integrated in circuit breaker 10. In particular, the circuit breaker may include a shunt, a Hall-effect sensor, an LEM converter and/or an appropriate current or power sensor. In this case, by evaluation or comparison to stored/programmed limits and/or characteristic curves, the exceeding of the specified tripping load may be detected and, if occasion arises, switching-off mechanism 16 may be activated. The switching-off may also be accomplished by a magnetic trip element.

As an alternative to, or in addition to that, the circuit breaker may also include temperature sensing. In this case, a sensor for measuring a temperature at at least one element, through which the current flows 14, is integrated in the circuit breaker. A comparison and/or an evaluation of the sensor data to/using stored/programmed limits and/or characteristic curves, in order to detect the exceeding of the tripping load, and therefore, a probable overload of power supply line 12, is also feasible in this case. In one advantageous, specific embodiment of such a circuit breaker 10, PTC and/or NTC temperature sensors may be used for the measurements.

In addition, a thermal trip element may be integrated in circuit breaker 10. For example, such a thermal trip element may have a bimetal, which, in the case of an overload, bends due to the heating from the comparatively high amperage of the current flow 14 through the bimetal, and therefore, trips the switching-off mechanism 16 containing the bimetal.

A circuit breaker 10 having a thermal trip element ensures reliable tripping of circuit breaker 10 in response to a capacity utilization greater than the tripping load. In this context, a preferred tripping load may be specified using a nominal value, for example, 16 A. In particular, using the material and/or the size of the bimetal used, a thermal trip element may be inexpensively formed to have the additional function, that the time from exceeding the nominal current up to the tripping of circuit breaker 10 is a function of the difference of the nominal current and the current intensity of the overload current.

Power supply line 12 may be, for example, a power supply line 12 running through a plurality of rooms 18 and 20 of a residential building. Because of the technology of the exemplary embodiments and/or exemplary methods of the present invention described below, power supply line 12 does not have to be configured for a flow of current 14 having a comparatively high current intensity. Consequently, an inexpensive, standard power supply line 12 may also act in combination with circuit breaker 10 and/or with the charging device 22 described below.

A rechargeable energy store 24 of a load circuit 26 is coupled to power supply line 12. Charging device 22 may be integrated, together with rechargeable energy store 24, at or in load circuit 26. Rechargeable energy store 24 may be a battery, in particular, a vehicle battery of a load circuit 26, which is configured as an electric vehicle and/or a hybrid vehicle and is parked in garage 18. Charging device 22 may take the form of a subunit of rechargeable energy store 24 or a compact unit positionable externally from energy store 24.

In addition to rechargeable energy store 24, at least one more current consumer 28 may be situated in garage 18 and/or in the at least one further room 20, the current consumer being coupled to power supply line 12 in such a manner, that during an active mode, the current consumer is supplied with energy by it. The at least one further load circuit 28 may be a standard consumer, such as a washing machine, a refrigerator, a lighting system and/or a corresponding electrical device. As will become clear in the following, due to the advantageous configuration of circuit breaker 10, it is not necessary to provide such a current consumer 28 with a communication device.

In addition to, or as an alternative to, the at least one further current consumer 28, at least one further energy store 30 may also be connected to power supply line 12. The at least one further energy store 30 may also be charged by a separate charging current provided by power supply line 12. It should be pointed out that the technology of the exemplary embodiments and/or exemplary methods of the present invention that is described in the following may also be implemented without the at least one further energy store 30 or without circuit breaker 10.

In the following, the interaction of charging device 22, circuit breaker 10 and/or the at least one further energy store 30 is described by way of example:

Circuit breaker 10 has a sensor device 32, with the aid of which a piece of utilization information regarding a capacity utilization of a tripping load of the circuit breaker may be ascertained. Examples of such a piece of utilization information have already been mentioned above. A sensor signal 34 corresponding to the ascertained utilization information is supplied to a signal output device 36 of circuit breaker 10 by sensor device 32. Signal output device 36 is configured to supply a utilization information signal 37 corresponding to the utilization information to at least the charging device 22 for rechargeable energy store 24. In summary, circuit breaker 10 may be referred to as a circuit breaker 10 having a measuring and communication device.

In particular, a circuit breaker 10 having a thermal trip element may include a sensor device 32, which is configured to ascertain a piece of temperature information regarding a temperature of a current-carrying component of the thermal trip element, for example, a bimetal component, as at least part of the utilization information 34. This integration of sensor device 32 into the thermal trip element reduces the costs and the size of such a circuit breaker 10.

Signal output device 36 may be additionally configured to output utilization information signal 37 through power supply line 12 to charging device 22. Such power-line communication from circuit breaker 10 to charging device 22 allows signal output device 36 to be constructed inexpensively. In addition, the use of power supply line 12 as a transmission medium ensures transmission of the ascertained utilization information and/or of a piece of information derived from this, independently of electromagnetic interference signals, in a spatial environment of circuit breaker 10 and charging device 22. In this case, it is also ensured that charging device 22 only receives utilization information signal 37 from a circuit breaker 10 of a power supply line 12, with which charging device 22 interacts for charging rechargeable energy store 24.

However, as shown by dashed line 38 in FIG. 2, the communication from circuit breaker 10 to charging device 22 is not limited to the use of power supply line 12 for transmitting utilization information signal 37. For example, signal output device 36 may also be configured to provide utilization information signal 37 wirelessly, for example, as an electromagnetic signal.

Together with a piece of utilization information regarding a current capacity utilization of circuit breaker 10, technical data regarding the type of circuit breaker 10 (e.g., 16-A type) may also be supplied by signal output device 36 to charging device 22 via utilization information signal 37. The utilization information may include, for example, a warning that the circuit breaker is close to tripping, a percent utilization of the tripping load and/or a current intensity value of current flow 14. However, the examples mentioned here do not limit the utilization information.

A component 40, which may take the form of a charging device, for example, is optionally coupled to the at least one further energy store 30. In particular, the at least one component 40 may be configured in accordance with the charging device 22 described below. The at least one component 40 may be configured to output a separate charging information signal 41 including a piece of separate charging information regarding a power and/or a remaining time of a separate charging current supplied by power supply line 12, to the at least one further energy store 30, in order to charge the at least one further energy store 30. Separate charging information signal 41 may also be outputted wirelessly or by wire to charging device 22.

Charging device 22 has a receiving device 42. Receiving device 42 is configured to receive utilization information signal 37 and/or separate charging information signal 41.

Charging device 22 additionally includes an evaluation device 44, which is configured to set at least one selection variable regarding a time characteristic of a setpoint current intensity of a setpoint current supplied by the power supply line to the rechargeable energy store. In this context, the setting is carried out in view of the received utilization information signal and/or the received, separate charging information signal. To that end, receiving device 42 outputs a corresponding, received signal 46 to evaluation device 44. Examples of the at least one selection variable, which may be set by evaluation device 44, are listed above.

The evaluation device supplies a selection variable signal 48 including the at least one set selection variable to a control device 50 of charging device 22. After receiving selection variable signal 48, control device 50 is configured to output at least one control signal 52 to a charging circuit 54 in view of the at least one set selection variable. Charging circuit 54 may be controllable via the at least one control signal 52 in such a manner, that a charging current corresponding to the at least one set selection variable may be applied to rechargeable energy store 24 by power supply line 12 via charging circuit 54. Charging circuit 54 may be a subunit of charging device 22.

By controlling charging circuit 54 in this manner during the charging of rechargeable energy store 24, it is ensured that neither power supply line 12, nor circuit breaker 10 is overloaded or the rechargeable energy store is disconnected from the power supply system due to the tripping of circuit breaker 10. Therefore, the charging of rechargeable energy store 24 is adaptable to the driven current consumers 28 and/or the at least one energy store 30 to be charged. This ensures problem-free and safe use of wiring already present, such as power supply line 12, for charging a rechargeable energy store 24, while at the same time, reliably operating the current consumers 28 also connected and/or concurrently charging the at least one further energy store 30, in spite of a comparatively high power demand of rechargeable energy store 24. In this context, one may take particular advantage of the fact that a rechargeable energy store 24 often already includes a charging circuit 54, with the aid of which a power input is controllable. In this context, power supply line 12 represents a protected circuit, via which the charging of rechargeable energy store 24 may also be charged using a house connection. In particular, the technology of the exemplary embodiments and/or exemplary methods of the present invention that is described here is advantageous for charging a rechargeable energy store of an electric or hybrid vehicle at a charging station not specially configured for that purpose, but, e.g., in the garage 18 at home.

The use of the circuit breaker 10 described here is associated with the further advantage, that in the case of house installations customary today (wiring and/or fusing), several jacks and lighting systems in a plurality of rooms are already protected by a common circuit breaker 10. Such a circuit breaker 10 is easily exchangeable, in particular, if it is positionable on a branch that leads into garage 18. Consequently, the installation of a device for ensuring the advantages described here is easy to carry out and associated with low costs. Circuit breaker 10 may have the same dimensions and basic functions as standard switches, such as downward compatibility and/or a "plug-and-play function."

In one situation in which current consumers 28 and, possibly, at least one further energy store 30 have a low power requirement, it is possible to provide a lot of energy to rechargeable energy store 24 very rapidly, without having to use a power supply system exclusively available specially to rechargeable energy store 24 for that purpose. In contrast, in a situation in which the at least one current consumer 28 and/or the at least one further energy store 30 has a significant power requirement, the tapping of energy from power supply line 12 for charging rechargeable energy store 24 may be reduced and/or delayed so that there is no risk of tripping circuit breaker 10 and/or overloading power supply line 12. Consequently, the components 28 and 30 connected to power supply line 12 are prevented from being disconnected due to sudden tripping of circuit breaker 10. At the same time, electrical load circuits 28 and 30 may also be put into operation on the same power supply system/same power supply line 12 during the charging operation.

In this manner, reliable utilization of the power output of an electric circuit/power supply line 12 is ensured, while at the same time, rechargeable energy store 24 may be charged as rapidly as possible on this very circuit/power supply line 12. The charging power (power input) may be safely utilized up to the maximum allowable current. In this manner, a completely charged energy store 24 may be ensured without the charging being interrupted by the tripping of the circuit breaker. A cable fire and/or long-term overloading of power supply line 12 are also preventable.

Installations and wiring already present are also usable in the case of increased demands, as occur, for example, when charging an electric vehicle. However, this integration is also possible in the case of all high-power load circuits, which may control the power input. In one further refinement, charging device 22 additionally includes an information output device (not sketched), with the aid of which a reference charging information signal regarding the time characteristic of the setpoint current intensity may be output, during the activation of charging circuit 54, to the component 40 coupled to the at least one further energy store 30. Consequently, charging device 22 and component 40 may receive information from each other and interpret it as intelligent load circuits/charging devices. Subsequently, each of the two intelligent load circuits may suitably adjust its own power consumption from power supply line 12. In this context, it is possible, for example, to choke in response to imminent overload, or to increase to a maximum feasible power.

What is claimed is:

1. A method for charging a rechargeable energy store, the method comprising:
   coupling the rechargeable energy store to a power supply line;
   performing at least one of (i) ascertaining a piece of utilization information that indicates a utilization amount corresponding to a current load that is sufficient to trip a circuit breaker coupled to the power supply line, and (ii) ascertaining a separate piece of charging information regarding at least one of a power and a time remaining of a separate charging current supplied to a further energy store by the power supply line;
   setting a time characteristic of a setpoint current intensity of a charging current supplied by the power supply line, based on the at least one of the ascertained utilization information and the ascertained, separate charging information; and
   applying the charging current from the power supply line to the rechargeable energy store.

2. The method of claim 1, wherein the time characteristic is set by setting at least one of (i) a constant setpoint current intensity of the charging current, (ii) a greatest current intensity of the setpoint current intensity, (iii) a time characteristic of a varying setpoint current intensity of the charging current, (iv) a waiting time prior to activating the charging current, and (v) a break-off time of the charging current.

3. The method of claim 1, wherein while the charging current is applied to the rechargeable energy store, a piece of reference charging information regarding the time characteristic of the setpoint current intensity is outputted to a component coupled to the further energy store.

4. A charging device for a rechargeable energy store, comprising:
   a receiving device, which is configured to receive, from a circuit breaker of a power supply line to which the rechargeable energy store is coupleable, at least one of (i) an outputted utilization information signal that indicates a utilization amount corresponding to a current load that is sufficient to trip the circuit breaker and (ii) a separate charging information signal, which is outputted by a component coupled to a further energy store, wherein the separate charging information signal indicates at least one of a power and a time remaining of a separate charging current provided by the power supply line to the further energy store;
   an evaluation device, which is configured to set a time characteristic of a setpoint current intensity of a charging current suppliable by the power supply line to the rechargeable energy store, based on at least one of the received utilization information signal and the received, separate charging information signal; and a control device, which is configured to supply at least one control signal to a charging circuit, such that the charging circuit produces the charging current according to the time characteristic of the setpoint current intensity set by the evaluation device.

5. The charging device of claim 4, wherein the charging device includes an information output device, with the aid of which a reference charging information signal regarding the time characteristic of the setpoint current intensity is output, during activation of the charging circuit, to the component coupled to the further energy store.

6. A rechargeable energy store, comprising:
a charging device for a rechargeable energy store, including:
  a receiving device, which is configured to receive, from a circuit breaker of a power supply line to which the rechargeable energy store is coupleable, at least one of an outputted utilization information signal that indicates a utilization amount corresponding to a current load that is sufficient to trip the circuit breaker and a separate charging information signal, which is outputted by a component coupled to a further energy store, wherein the separate charging information signal indicates at least one of a power and a time remaining of a separate charging current provided by the power supply line to the further energy store;
  an evaluation device, which is configured to set a time characteristic of a setpoint current intensity of a charging current suppliable by the power supply line to the rechargeable energy store, based on at least one of the received utilization information signal and the received, separate charging information signal; and
  a control device, which is configured to supply at least one control signal to a charging circuit, such that the charging circuit produces the charging current according to the time characteristic of the setpoint current intensity set by the evaluation device.

7. A vehicle, comprising:
at least one of a charging device and a rechargeable energy store having the charging device;
wherein the charging device charges the rechargeable energy store, and includes:
  a receiving device, which is configured to receive, from a circuit breaker of a power supply line to which the rechargeable energy store is coupleable, at least one of an outputted utilization information signal that indicates a utilization amount corresponding to a current load that is sufficient to trip the circuit breaker and a separate charging information signal, which is outputted by a component coupled to a further energy store, wherein the separate charging information signal indicates at least one of a power and a time remaining of a separate charging current provided by the power supply line to the further energy store;
  an evaluation device, which is configured to set a time characteristic of a setpoint current intensity of a charging current suppliable by the power supply line to the rechargeable energy store, based on at least one of the received utilization information signal and the received, separate charging information signal; and
  a control device, which is configured to supply at least one control signal to a charging circuit, such that the charging circuit produces the charging current according to the time characteristic of the setpoint current intensity set by the evaluation device.

8. A circuit breaker, comprising:
a sensor device, which is configured to ascertain a piece of utilization information that indicates a utilization amount corresponding to a current load that is sufficient to trip the circuit breaker; and
a signal output device, which is configured to supply a utilization information signal corresponding to the piece of utilization information to a charging device for a rechargeable energy store;
wherein the charging device charges the rechargeable energy store, and includes:
  a receiving device, which is configured to receive, from a circuit breaker of a power supply line to which the rechargeable energy store is coupleable, at least one of the utilization information signal and a separate charging information signal, which is outputted by a component coupled to a further energy store, wherein the separate charging information signal indicates at least one of a power and a time remaining of a separate charging current provided by the power supply line to the further energy store;
  an evaluation device, which is configured to set a time characteristic of a setpoint current intensity of a charging current suppliable by the power supply line to the rechargeable energy store, based on at least one of the received utilization information signal and the received, separate charging information signal; and
  a control device, which is configured to supply at least one control signal to a charging circuit, such that the charging circuit produces the charging current according to the time characteristic of the setpoint current intensity set by the evaluation device.

9. The circuit breaker of claim 8, wherein the signal output device is configured to supply the utilization information signal to the charging device via the power supply line when the circuit breaker and the charging device are both connected to the power supply line.

10. The circuit breaker of claim 8, wherein the circuit breaker includes a thermal trip element, by which the circuit breaker is tripped in response to an actual utilization amount that is at least equal to the indicated utilization amount; and wherein the sensor device is configured to ascertain a piece of temperature information as at least part of the utilization information, the piece of temperature information indicating a temperature of a current-carrying component of the thermal trip element.

* * * * *